(12) United States Patent
Labonte et al.

(10) Patent No.: US 11,316,761 B2
(45) Date of Patent: Apr. 26, 2022

(54) AUTOMATED STATEFUL COUNTER AGGREGATION OF DEVICE DATA

(71) Applicant: EMC IP Holding Company LLC, Hopkinton, MA (US)

(72) Inventors: Kevin S. Labonte, Upton, MA (US); Vijayagomathi Ramasamy, Chelmsford, MA (US); Kshitij Patel, Cary, NC (US); Peter Beale, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 16/778,850

(22) Filed: Jan. 31, 2020

(65) Prior Publication Data

US 2021/0243092 A1    Aug. 5, 2021

(51) Int. Cl.
*G06F 16/21* (2019.01)
*G06F 16/28* (2019.01)
*G06F 16/25* (2019.01)
*H04L 43/04* (2022.01)
*H04L 43/50* (2022.01)

(52) U.S. Cl.
CPC .......... *H04L 43/04* (2013.01); *G06F 16/219* (2019.01); *G06F 16/25* (2019.01); *G06F 16/283* (2019.01); *H04L 43/50* (2013.01)

(58) Field of Classification Search
CPC ..... H04L 43/04; H04L 43/50; H04L 41/0806; H04L 43/065; H04L 43/067; H04L 41/142; G06F 16/25; G06F 16/219; G06F 16/283

See application file for complete search history.

(56) References Cited

U.S. PATENT DOCUMENTS

| | | |
|---|---|---|
| 8,108,511 B2 | 1/2012 | Britt |
| 9,842,017 B1 | 12/2017 | Zhang et al. |
| 2014/0095412 A1* | 4/2014 | Agashe ............ G06Q 50/01 706/12 |
| 2016/0328432 A1* | 11/2016 | Raghunathan ...... G06F 16/2264 |
| 2018/0019931 A1* | 1/2018 | Jalan .................... H04L 43/106 |
| 2018/0174072 A1 | 6/2018 | Charles et al. |
| 2019/0108888 A1 | 4/2019 | Sarkar et al. |
| 2019/0182119 A1* | 6/2019 | Ratkovic ............... H04L 41/145 |
| 2020/0057430 A1* | 2/2020 | Kettemer .......... G05B 19/4185 |
| 2020/0073866 A1* | 3/2020 | Joyner ................ G06F 16/2477 |
| 2020/0334123 A1* | 10/2020 | Chatterjee ............ G06F 9/4498 |

\* cited by examiner

*Primary Examiner* — Dangelino N Gortayo

(74) *Attorney, Agent, or Firm* — Ryan, Mason & Lewis, LLP

(57) ABSTRACT

Methods, apparatus, and processor-readable storage media for automated stateful counter aggregation of device data are provided herein. An example computer-implemented method includes obtaining historical aggregate counter data and historical individual member counter data associated with a variable set of device members and a given temporal period; computing one or more stateful aggregate counter data values attributed to at least a portion of the variable set of device members for a given temporal value by applying at least one stateful counter aggregation algorithm to the obtained data; and performing one or more automated actions based at least in part on the one or more computed stateful aggregate counter data values.

20 Claims, 7 Drawing Sheets

|  | Time1 (T1) | T2 | T3 | T4 |
|---|---|---|---|---|
| Member1 (M1) | 1 | 2 | 3 | 4 |
| M2 | 11 | 13 | 15 | 17 |
| M3 | 13 | 16 | 19 | 22 |
| Aggregated Delta Value | 0 | 6 | 6 | 6 |
| Cumulative Aggregated Delta Value | 0 | 6 | 12 | 18 |
| Aggregated Rate Value | N/A | 6 | 6 | 6 |

|  | T1 | T2 | T3 | T4 |
|---|---|---|---|---|
| M1 | 1 | 2 | 3 | 4 |
| M2 | 11 | 13 |  |  |
| M3 | 13 | 16 | 19 | 22 |
| Aggregated Delta Value | 0 | 6 | 4 | 4 |
| Cumulative Aggregated Delta Value | 0 | 6 | 10 | 14 |
| Aggregated Rate Value | N/A | 6 | 4 | 4 |

|  | T3 | T4 | T5 | T6 |
|---|---|---|---|---|
| M1 | 3 | 4 | 5 | 6 |
| M3 | 19 | 22 | 25 | 28 |
| M4 |  |  | 60 | 64 |
| Aggregated Delta Value | 4 | 4 | 4 | 8 |
| Cumulative Aggregated Delta Value | 10 | 14 | 18 | 26 |
| Aggregated Rate Value | 4 | 4 | 4 | 8 |

AUTOMATED STATEFUL COUNTER AGGREGATION OF DEVICE DATA

FIELD

The field relates generally to information processing systems, and more particularly to data analysis in such systems.

BACKGROUND

Determining counter values of various device parameters can be valuable for numerous analytics device management purposes. Conventional device monitoring approaches utilize stateless counter aggregation techniques, which do not leverage knowledge of the previous values of each individual member counter. Accordingly, whenever members are added or removed, such conventional approaches fail to compute an aggregated metric at that time instance, resulting in a gap (i.e., a missing value) in the historical dataset. Additionally, in instances wherein an individual counter was reset unexpectedly, such conventional approaches detect an invalid aggregated metric and insert a gap and/or an erroneous value in its place in the dataset. Consequently, such conventional approaches commonly provide incomplete and/or erroneous datasets, which are disadvantageous for subsequent use in analytics and/or device management actions.

SUMMARY

Illustrative embodiments of the disclosure provide automated stateful counter aggregation of device data. An exemplary computer-implemented method includes obtaining historical aggregate counter data and historical individual member counter data associated with a variable set of device members and a given temporal period, and computing one or more stateful aggregate counter data values attributed to at least a portion of the variable set of device members for a given temporal value by applying at least one stateful counter aggregation algorithm to the obtained data. Further, the method also includes performing one or more automated actions based at least in part on the one or more computed stateful aggregate counter data values.

Illustrative embodiments can provide significant advantages relative to conventional device monitoring approaches. For example, problems associated with generation of incomplete and/or erroneous counter aggregation datasets are overcome in one or more embodiments through implementing a stateful counter aggregation algorithm to generate more accurate and/or complete aggregated data pertaining to a variable set of member counters.

These and other illustrative embodiments described herein include, without limitation, methods, apparatus, systems, and computer program products comprising processor-readable storage media.

BRIEF DESCRIPTION OF THE DRAWINGS

FIG. 3 shows an example table of stateful aggregation values computed in connection with a set of devices wherein a member is removed in an illustrative embodiment.

FIG. 4 shows an example table of stateful aggregation values computed in connection with a set of devices wherein a member is added in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
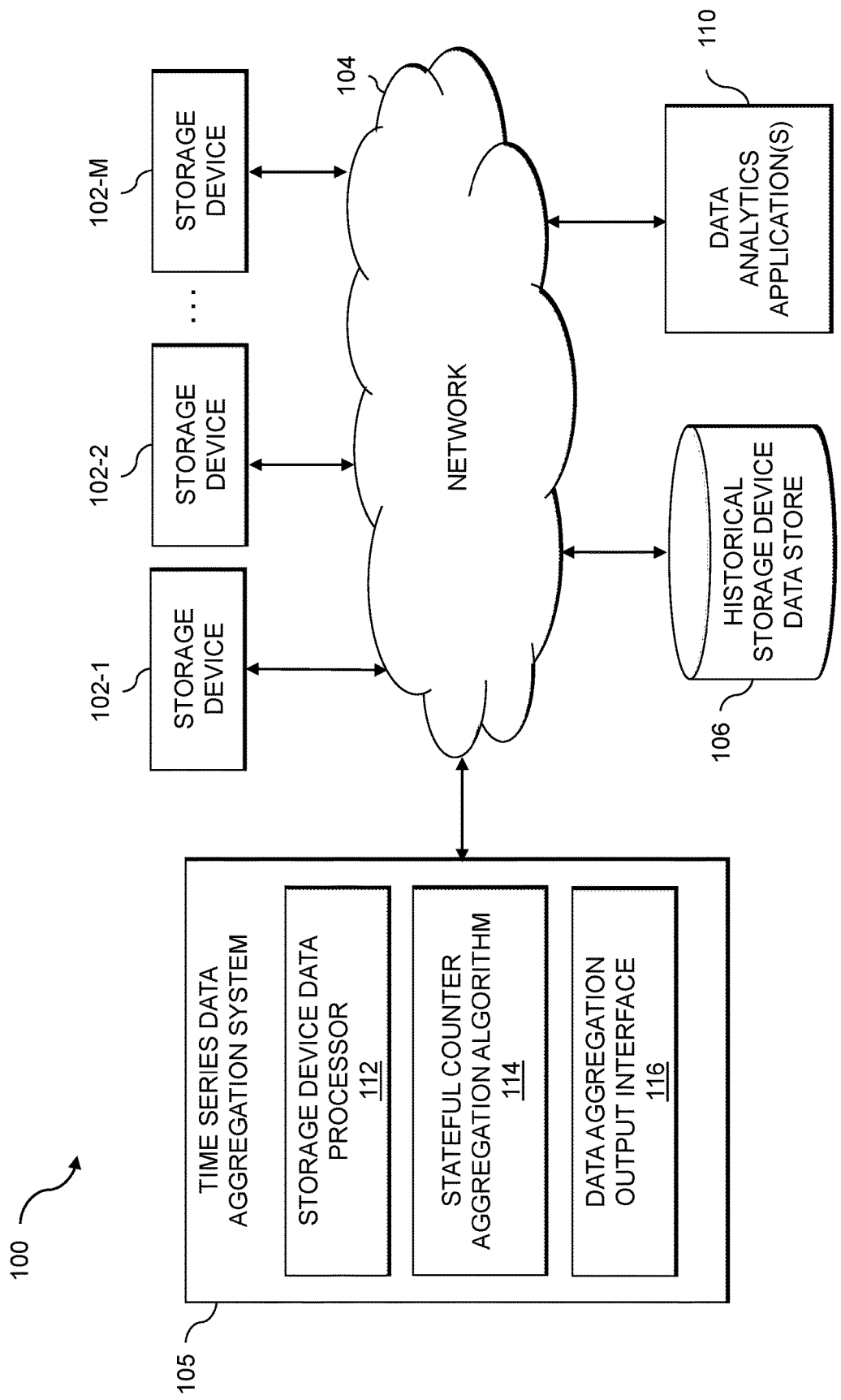
FIG. 1 shows an information processing system configured for automated stateful counter aggregation of device data in an illustrative embodiment.

FIG. 1 shows a computer network (also referred to herein as an information processing system) 100 configured in accordance with an illustrative embodiment. The computer network 100 comprises a plurality of storage devices 102-1, 102-2, . . . 102-M, collectively referred to herein as storage devices 102. The storage devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is time series data aggregation system 105, and data analytics application(s) 110, which performs one or more actions and/or analyses based on the output(s) of the time series data aggregation system 105.

The storage devices 102 in some embodiments comprise respective storage devices associated with a particular company, organization or other enterprise. In addition, at least portions of the computer network 100 may also be referred to herein as collectively comprising an "enterprise network." Numerous other operating scenarios involving a wide variety of different types and arrangements of devices and networks are possible, as will be appreciated by those skilled in the art.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the time series data aggregation system 105 can have an associated historical storage device data store 106 configured to store data pertaining to historical counter data, membership information, etc.

The data store 106 in the present embodiment is implemented using one or more storage systems associated with time series data aggregation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the time series data aggregation system 105 are input-output devices, which illustratively comprise keyboards, displays or other types of input-output devices in any combination. Such input-output devices can be used, for example, to support one or more user interfaces to time series data aggregation system 105, as well as to support communication between time series data aggregation system 105 and other related systems and devices not explicitly shown.

Also, the time series data aggregation system 105 in the FIG. 1 embodiment is assumed to be implemented using at least one processing device. Each such processing device generally comprises at least one processor and an associated memory, and implements one or more functional modules for controlling certain features of the time series data aggregation system 105.

More particularly, the time series data aggregation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the time series data aggregation system 105 to communicate over the network 104 with the storage devices 102, and illustratively comprises one or more conventional transceivers.

The time series data aggregation system 105 further comprises a storage device data processor 112, a stateful counter aggregation algorithm 114, and a data aggregation output interface 116.

It is to be appreciated that this particular arrangement of modules 112, 114, and 116 illustrated in the time series data aggregation system 105 of the FIG. 1 embodiment is presented by way of example only, and alternative arrangements can be used in other embodiments. For example, the functionality associated with modules 112, 114, and 116 in other embodiments can be combined into a single module, or separated across a larger number of modules. As another example, multiple distinct processors can be used to implement different ones of modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for automated stateful counter aggregation of device data involving storage devices 102 of computer network 100 is presented by way of illustrative example only, and in other embodiments additional or alternative elements may be used. Thus, another embodiment includes additional or alternative systems, devices and other network entities, as well as different arrangements of modules and other components.

For instance, while FIG. 1 depicts an example embodiment utilizing storage devices, it is to be appreciated that one or more embodiments can be implemented utilizing other types of devices such as servers, as well as user devices such as mobile telephones, laptop computers, tablet computers, desktop computers or other types of computing devices. Such devices are examples of what are more generally referred to herein as "processing devices." Some of these processing devices are also generally referred to herein as "computers." Also, it is to be appreciated that the term "user" in this context and elsewhere herein is intended to be broadly construed so as to encompass, for example, human, hardware, software or firmware entities, as well as various combinations of such entities.

By way of further example, in one or more embodiments, modules 112, 114, and 116 (or modules analogous thereto), data store 106, and/or data analytics application(s) 110 can reside in the cloud, and the devices (e.g., storage devices 102) providing the input data reside in respective user environments.

An exemplary process utilizing modules 112, 114, and 116 (or modules analogous thereto) of a system analogous to example time series data aggregation system 105 in computer network 100 will be described in more detail with reference to the flow diagram of FIG. 5.

Accordingly, at least one embodiment includes implementing a stateful counter aggregation algorithm that improves data quality by eliminating gaps in time series data of aggregate counter values, wherein the aggregate counter values are computed from a variable set of member counters, and/or by reducing errors in time series data of aggregate counter values, wherein the aggregate counter values are computed from member counters that may reset unexpectedly. Such an embodiment provides advantages pertaining to data quality, as source data quality is often a differentiating factor for analytics algorithms in various contexts. For example, many performance charts and/or analyses plot metrics over time, either at the aggregate or individual object level, and various data analytics can be based on analysis of these same historical performance metrics.

As used herein, a "counter" refers to a monotonically increasing value (e.g., a 64-bit unsigned integer) that measures some aspect of an object (e.g., logical unit number (LUN) reads). Additionally, a "metric" refers to a change in counter values over time (e.g., LUN reads per second). In one or more embodiments, counters and metrics can be calculated at an aggregate level (e.g., at a pool-level) based on individual and/or member values (e.g., each storage object within a given pool). Aggregate objects can contain a constant set of members (e.g., a set of physical central processing unit (CPU) cores) or a variable set of members (e.g., a set of LUNs configured in a pool).

By way merely of illustration, example aggregates used in connection with a storage monitoring tool can include a disk tier aggregate (with respect to disk members), a pool tier aggregate (with respect to disk members), a pool backend aggregate (with respect to disk members), a pool frontend aggregate (with respect to LUN, file system, and data store members), a system backend aggregate (with respect to disk members), and/or a system frontend aggregate (with respect to LUN, file system, and data store members). These and other references to "disks" herein are intended to refer generally to storage devices, including solid state drives (SSDs), and should therefore not be viewed as limited in any way to spinning magnetic media.

As noted above and further detailed herein, at least one embodiment includes computing accurate and reliable aggregate counters (and in turn, aggregate metrics) using stateful aggregation logic. In such an embodiment, the logic leverages knowledge about previous aggregate and individual member counters while computing aggregate values for a current and/or subsequent time. A description of an example stateful aggregation algorithm used in accordance with one or more embodiments includes the following (and is further illustrated in example tables 200, 300, and 400 depicted in FIG. 2, FIG. 3, and FIG. 4, respectively).

Data payload containing current counter values for individual members of a variable set is obtained, and the following steps run for one or more supported aggregations (e.g., system-level aggregation, pool-level aggregation, etc.). Previous aggregate and individual member counter values, as well as relationship data (e.g., identifications of which LUNs were members of each pool), are retrieved and/or obtained from an historical time series-based data store. If this is the first time computing an aggregate counter value for a given object or device (e.g., Pool A), then the algorithm sets the initial value of a synthesized aggregate counter (also referred to herein as a cumulative aggregate delta value) to a given value (e.g., zero). If this is not the first time computing an aggregate counter value for a given object or device, then the algorithm computes the aggregated delta across individual member counters for those members that exist in both the previous and current datasets.

For each such member, the algorithm calculates the delta (i.e., the difference) between the previous counter value and current counter value, and adds this delta to an aggregated delta value. Additionally, for each such member, the algorithm ignores negative deltas (that is, instances wherein the current value is less than previous value), as this indicates that the counter was reset unexpectedly, and using such negative deltas can contribute to errors in the final result and/or output. New members (that is, members existing in the current dataset but not in the previous dataset) are also ignored because their delta value(s) cannot be determined (which could lead to the inclusion of incorrect data in the final result and/or output). Note, however, that if one or more embodiments include guaranteeing a reset to zero when becoming a new member of an aggregate, the algorithm could compute the delta from zero instead of ignoring such a value. Additionally, with respect to the aggregate delta value calculation, removed members (that is, members existing in the previous dataset but not in the current dataset) are also ignored because their delta value(s) cannot be determined (which could lead to the inclusion of incorrect data in the final result and/or output).

The algorithm then adds the aggregated delta to the previous aggregate counter to create the current cumulative aggregate delta value. In one or more embodiments, the absolute value of the cumulative aggregate delta value is less significant than the rate of change of the cumulative aggregate delta value over time. At least one embodiment further includes saving and/or storing the current cumulative aggregate delta value and individual member counter values, as well as related relationship data, in a historical time series-based data store.

In another manner of description, with stateful aggregation, at least one embodiment includes summing across common members (that is, members that exist in both previous and current datasets) as follows:

$$AC_{T_1} = AC_{T_0} + \sum_{i=0}^{M} \left( C[i]_{T_1} - C[i]_{T_0} \right)$$

wherein:
  $AC_{T_1}$=an aggregated counter value (also referred to herein as cumulative aggregate delta value) value at some time $T_1$;
  $C[i]_{T_1}$=an individual member counter value from member i at $T_1$; and
  M=the number of common member counters at $T_1$.

Using such an equation, the aggregate counter is synthesized (and also referred to herein as the cumulative aggregate delta value).

Figure 2:
FIG. 2 shows an example table of stateful aggregation values computed in connection with a set of devices without membership changes in an illustrative embodiment.

FIG. 2 shows an example table 200 of stateful aggregation values computed in connection with a set of devices without membership changes in an illustrative embodiment.

FIG. 3 shows an example table 300 of stateful aggregation values computed in connection with a set of devices wherein a member is removed in an illustrative embodiment. In contrast to FIG. 2, table 300 in FIG. 3 illustrates implementation of the algorithm detailed above in connection with an example use case involving membership changes. Namely, in the table 300 example, when a member (here, M2) is no longer present at time T3, the cumulative aggregated delta value and the aggregated rate value are not impacted by the loss of M2 (as they would be using conventional techniques), because only the common members between T2 and T3 (here, M1 and M3) are considered for such calculations.

FIG. 4 shows an example table 400 of stateful aggregation values computed in connection with a set of devices wherein a member is added in an illustrative embodiment. Also in contrast to FIG. 2, table 400 in FIG. 4 additionally illustrates implementation of the algorithm detailed above in connection with an example use case involving membership changes. Namely, added members (which are not guaranteed to be initialized to zero) are ignored in their first occurrence, resulting in more accurate results. As shown in table 400, M4 is added to the variable set at T5, but is not used in the calculations between T4 and T5.

In one or more embodiments, using such an example algorithm, the cumulative aggregated delta values continue to be monotonically increasing, and the rates are non-negative. As such, errors due to the addition or removal of members to the variable set have been reduced, and gaps in the resulting data have been eliminated.

Figure 5:
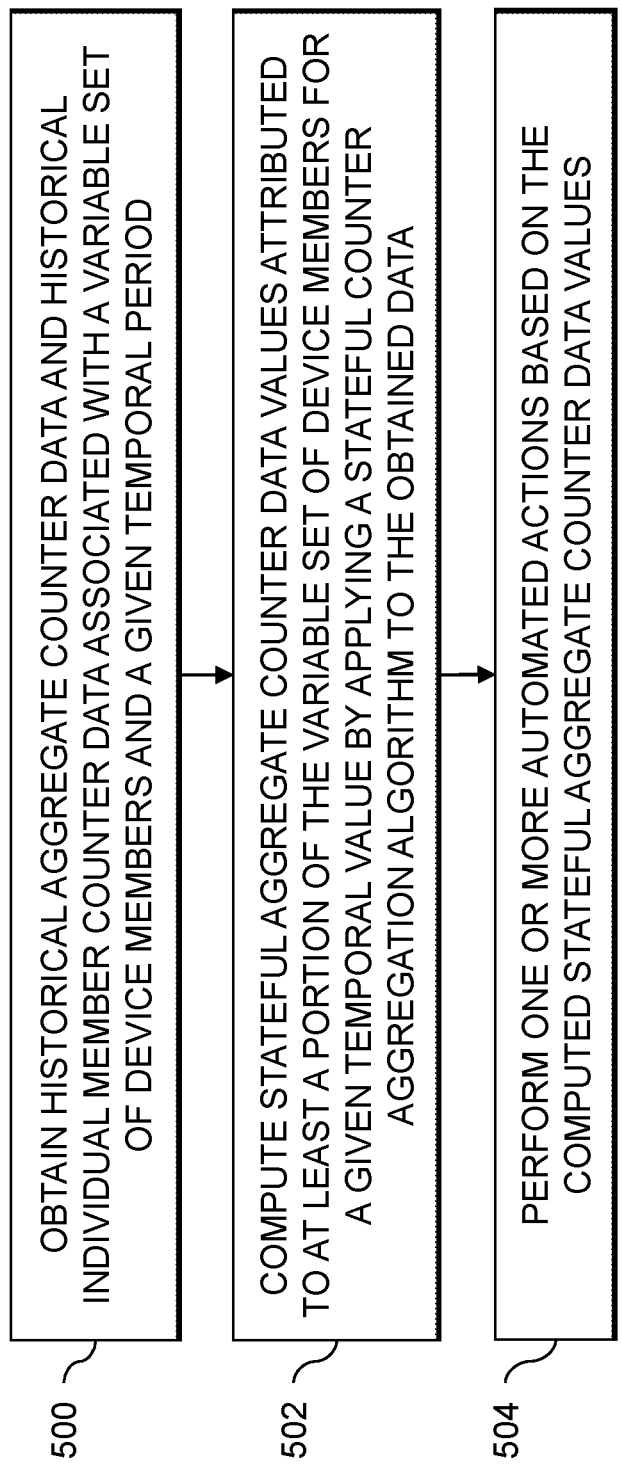
FIG. 5 is a flow diagram of a process for automated stateful counter aggregation of device data in an illustrative embodiment.

FIG. 5 is a flow diagram of a process for automated stateful counter aggregation of device data in an illustrative embodiment. It is to be understood that this particular process is only an example, and additional or alternative processes can be carried out in other embodiments.

In this embodiment, the process includes steps 500 through 504. These steps can be performed, for example, by a system similar and/or analogous to the time series data aggregation system 105 (utilizing modules similar and/or analogous to modules 112, 114, and 116).

Step 500 includes obtaining historical aggregate counter data and historical individual member counter data associated with a variable set of device members and a given temporal period. In one or more embodiments, the variable set of device members can include a set of device members wherein at least one device member has been removed from the set during the given temporal period, a set of device members wherein at least one device member has been added to the set during the given temporal period, and/or a set of device members wherein at least a portion of individual member counter data of at least one device member resets during the given temporal period. As used herein, counter data "resets" when it unexpectedly and/or erroneously changes in a manner not consistent with the contextual data (e.g., the counter data value goes to zero unexpectedly).

Step 502 includes computing one or more stateful aggregate counter data values attributed to at least a portion of the variable set of device members for a given temporal value by applying at least one stateful counter aggregation algorithm to the obtained data. In one or more embodiments, applying the at least one stateful counter aggregation algorithm includes applying the at least one stateful counter aggregation algorithm to the obtained data and to new individual counter data associated with the variable set of device members. In such an embodiment, applying the at least one stateful counter aggregation algorithm can include computing one or more aggregated delta values across individual counter data for each of the device members having individual counter data in both the obtained data and the new individual counter data.

Further, computing the one or more aggregated delta values can include, for each of the device members having individual counter data in both the obtained data and the new individual counter data, calculating a delta value between a previous counter data value from the obtained data and the new counter data value. Also, one or more embodiments can include determining a new cumulative aggregate delta value for the variable set of device members by adding the calculated delta value to at least one previous cumulative aggregate delta value for the variable set of device members. Additionally or alternatively, computing the one or more aggregated delta values can include ignoring all negative delta values, ignoring all device members having individual counter data in the new individual counter data but not in the obtained data, and/or ignoring all device members having individual counter data in the obtained data but not in the new individual counter data.

Also, in one or more embodiments, applying the at least one stateful counter aggregation algorithm to the obtained data can include setting an initial value of a cumulative aggregated delta value for the variable set of device members to a given starting value.

Step 504 includes performing one or more automated actions based at least in part on the one or more computed stateful aggregate counter data values. Performing the one or more automated actions can include performing at least one analytics operation using the one or more computed stateful aggregate counter data values. Such an analytics operation can include, for example, detecting performance anomalies by comparing historical data patterns (of the aggregate values) to a current or recent data pattern, and flagging areas where the current or recent behavior is unexpected. Also, in at least one embodiment, performing the one or more automated actions includes automatically generating and outputting at least one visualization of the one or more computed stateful aggregate counter data values to at least one user via an interface.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement a stateful counter aggregation algorithm to generate more accurate and/or complete aggregated data pertaining to a variable set of member counters. These and other embodiments can effectively overcome problems associated with generation of incomplete and/or erroneous counter aggregation datasets.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
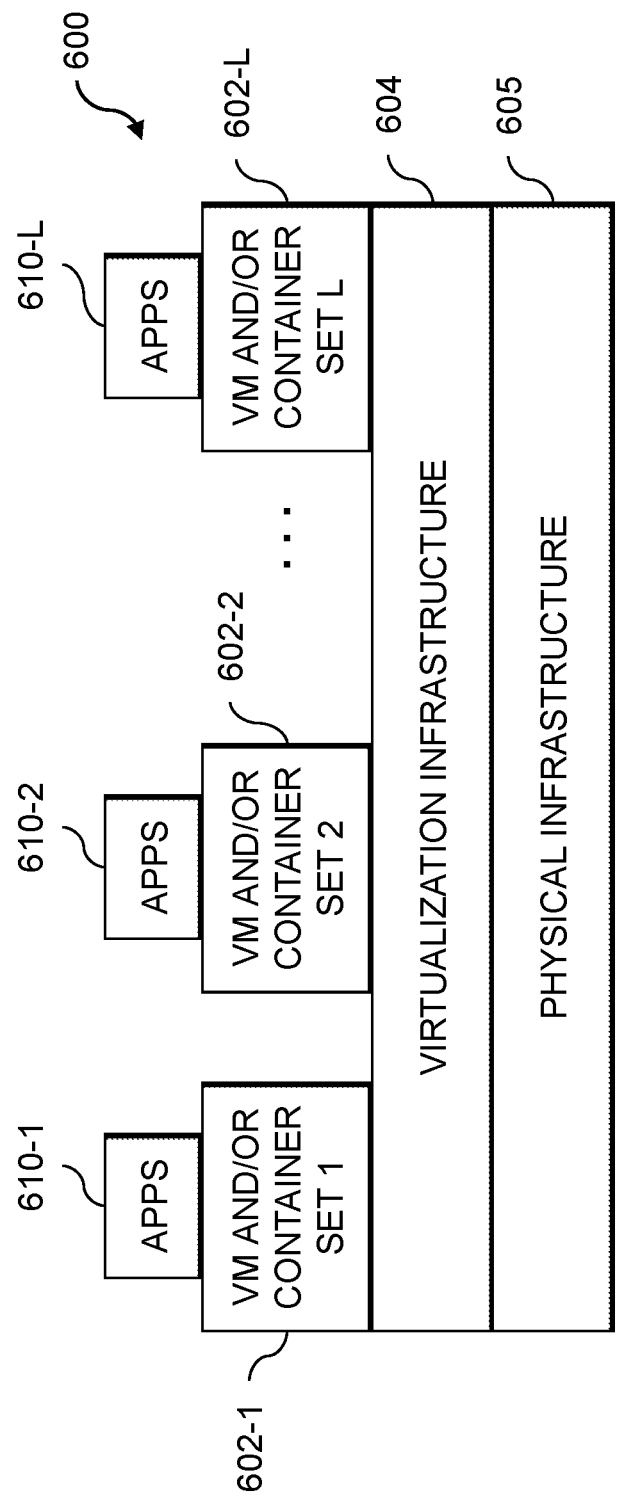
FIGS. 6 and 7 show examples of processing platforms that may be utilized to implement at least a portion of an information processing system in illustrative embodiments.
Figure 7:
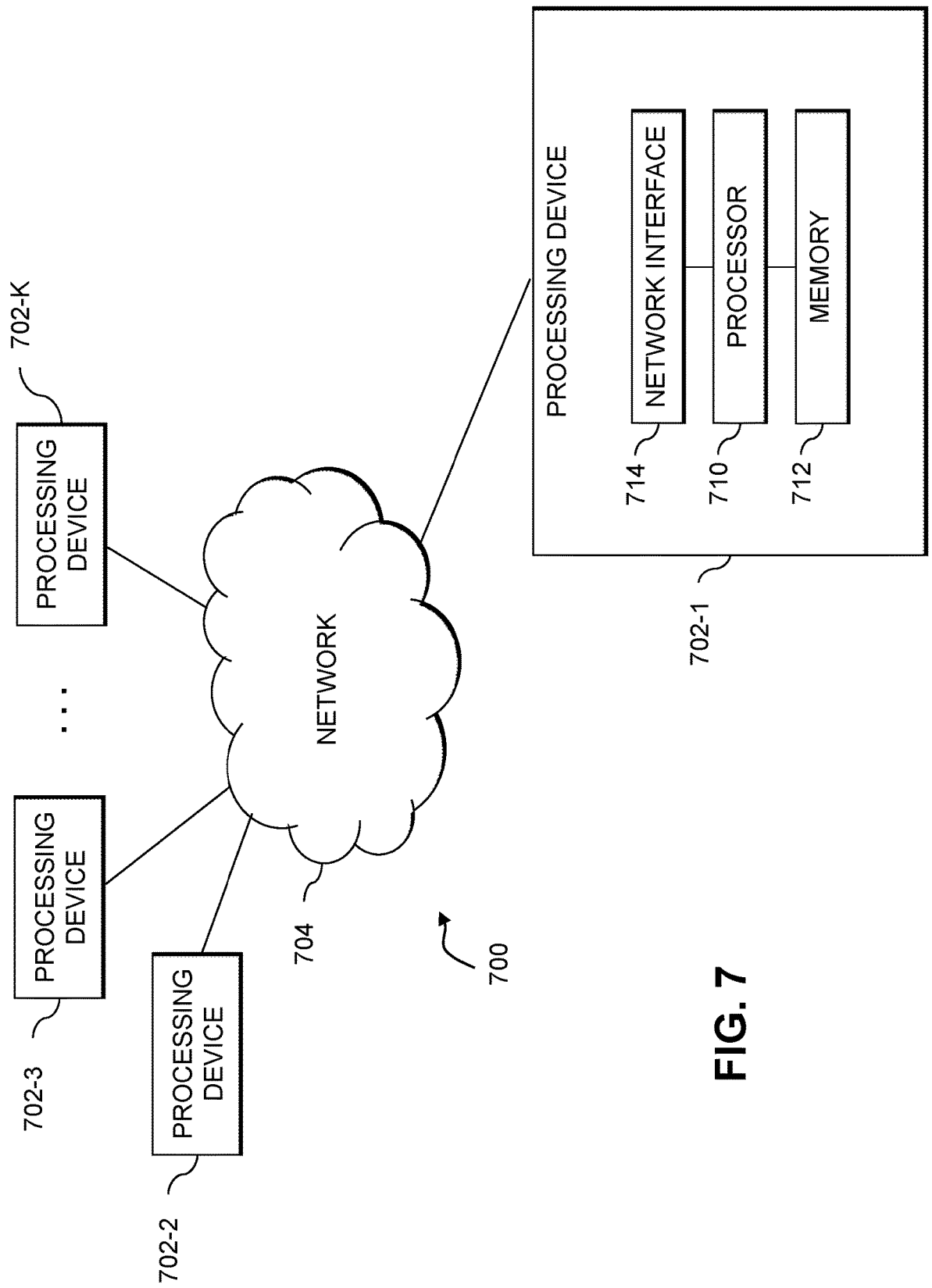

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining historical aggregate counter data and historical individual member counter data associated with a variable set of device members and a given temporal period, wherein the variable set of device members comprises a set of device members wherein: at least one device member has been removed from the set during the given temporal period and at least one device member has been added to the set during the given temporal period, and wherein at least a portion of individual member counter data of at least one device member reset during the given temporal period;
   computing one or more stateful aggregate counter data values attributed to at least a portion of the variable set of device members for a given temporal value by applying at least one stateful counter aggregation algorithm to the obtained data and to new individual member counter data associated with the variable set of device members, wherein applying the at least one stateful counter aggregation algorithm comprises computing one or more aggregated delta values across individual member counter data for each of the device members having individual member counter data in both the obtained data and the new individual member counter data; and
   performing one or more automated actions based at least in part on the one or more computed stateful aggregate counter data values;
   wherein the method is performed by at least one processing device comprising a processor coupled to a memory.

2. The computer-implemented method of claim 1, wherein computing the one or more aggregated delta values comprises, for each of the device members having individual member counter data in both the obtained data and the new individual member counter data, calculating a delta value between a previous counter data value from the obtained data and the new counter data value.

3. The computer-implemented method of claim 2, further comprising:
   determining a new cumulative aggregate delta value for the variable set of device members by adding the calculated delta value to at least one previous cumulative aggregate delta value for the variable set of device members.

4. The computer-implemented method of claim 1, wherein computing the one or more aggregated delta values comprises ignoring all negative delta values.

5. The computer-implemented method of claim 1, wherein computing the one or more aggregated delta values comprises ignoring all device members having individual member counter data in the new individual member counter data but not in the obtained data.

6. The computer-implemented method of claim 1, wherein computing the one or more aggregated delta values comprises ignoring all device members having individual member counter data in the obtained data but not in the new individual member counter data.

7. The computer-implemented method of claim 1, wherein applying the at least one stateful counter aggregation algorithm to the obtained data comprises setting an initial value of a cumulative aggregated delta value for the variable set of device members to a given starting value.

8. The computer-implemented method of claim 1, wherein performing the one or more automated actions comprises performing at least one analytics operation using the one or more computed stateful aggregate counter data values.

9. The computer-implemented method of claim 1, wherein performing the one or more automated actions comprises automatically generating and outputting at least one visualization of the one or more computed stateful aggregate counter data values to at least one user via an interface.

10. A non-transitory processor-readable storage medium having stored therein program code of one or more software programs, wherein the program code when executed by at least one processing device causes the at least one processing device:
    to obtain historical aggregate counter data and historical individual member counter data associated with a variable set of device members and a given temporal period, wherein the variable set of device members comprises a set of device members wherein: at least one device member has been removed from the set during the given temporal period and at least one device member has been added to the set during the given temporal period, and wherein at least a portion of individual member counter data of at least one device member reset during the given temporal period;
    to compute one or more stateful aggregate counter data values attributed to at least a portion of the variable set of device members for a given temporal value by applying at least one stateful counter aggregation algorithm to the obtained data and to new individual member counter data associated with the variable set of device members, wherein applying the at least one stateful counter aggregation algorithm comprises computing one or more aggregated delta values across individual member counter data for each of the device members having individual member counter data in both the obtained data and the new individual member counter data; and to perform one or more automated actions based at least in part on the one or more computed stateful aggregate counter data values.

11. The non-transitory processor-readable storage medium of claim 10, wherein computing the one or more aggregated delta values comprises:

for each of the device members having individual member counter data in both the obtained data and the new individual member counter data, calculating a delta value between a previous counter data value from the obtained data and the new counter data value.

12. The non-transitory processor-readable storage medium of claim 11, wherein the program code when executed by the at least one processing device further causes the at least one processing device:

to determine a new cumulative aggregate delta value for the variable set of device members by adding the calculated delta value to at least one previous cumulative aggregate delta value for the variable set of device members.

13. The non-transitory processor-readable storage medium of claim 10, wherein computing the one or more aggregated delta values comprises ignoring all negative delta values.

14. The non-transitory processor-readable storage medium of claim 10, wherein performing the one or more automated actions comprises performing at least one analytics operation using the one or more computed stateful aggregate counter data values.

15. An apparatus comprising:

at least one processing device comprising a processor coupled to a memory;

the at least one processing device being configured:

to obtain historical aggregate counter data and historical individual member counter data associated with a variable set of device members and a given temporal period, wherein the variable set of device members comprises a set of device members wherein: at least one device member has been removed from the set during the given temporal period and at least one device member has been added to the set during the given temporal period, and wherein at least a portion of individual member counter data of at least one device member reset during the given temporal period;

to compute one or more stateful aggregate counter data values attributed to at least a portion of the variable set of device members for a given temporal value by applying at least one stateful counter aggregation algorithm to the obtained data and to new individual member counter data associated with the variable set of device members, wherein applying the at least one stateful counter aggregation algorithm comprises computing one or more aggregated delta values across individual member counter data for each of the device members having individual member counter data in both the obtained data and the new individual member counter data; and to perform one or more automated actions based at least in part on the one or more computed stateful aggregate counter data values.

16. The apparatus of claim 15, wherein computing the one or more aggregated delta values comprises:

for each of the device members having individual member counter data in both the obtained data and the new individual member counter data, calculating a delta value between a previous counter data value from the obtained data and the new counter data value.

17. The apparatus of claim 16, wherein the at least one processing device being further configured:

to determine a new cumulative aggregate delta value for the variable set of device members by adding the calculated delta value to at least one previous cumulative aggregate delta value for the variable set of device members.

18. The apparatus of claim 15, wherein computing the one or more aggregated delta values comprises ignoring all negative delta values.

19. The apparatus of claim 15, wherein performing the one or more automated actions comprises performing at least one analytics operation using the one or more computed stateful aggregate counter data values.

20. The apparatus of claim 15, wherein performing the one or more automated actions comprises automatically generating and outputting at least one visualization of the one or more computed stateful aggregate counter data values to at least one user via an interface.

* * * * *